(12) United States Patent
Liu

(10) Patent No.: US 7,603,671 B2
(45) Date of Patent: Oct. 13, 2009

(54) PERFORMANCE MANAGEMENT IN A VIRTUAL COMPUTING ENVIRONMENT

(75) Inventor: Lei Liu, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 533 days.

(21) Appl. No.: 11/267,659

(22) Filed: Nov. 4, 2005

(65) Prior Publication Data
US 2007/0106769 A1    May 10, 2007

(51) Int. Cl.
G06F 9/455 (2006.01)
G06F 9/46 (2006.01)
G06F 15/16 (2006.01)
G06F 15/173 (2006.01)

(52) U.S. Cl. .................. 718/1; 718/100; 718/104; 718/105; 709/202; 709/224; 709/225; 709/226

(58) Field of Classification Search .............. 718/1, 718/100, 102, 103, 104, 105, 101; 709/201, 709/202, 203, 215, 216, 220, 221, 222, 223, 709/224, 225, 226, 229
See application file for complete search history.

(56) References Cited

U.S. PATENT DOCUMENTS

| | | | | |
|---|---|---|---|---|
| 6,615,261 | B1 * | 9/2003 | Smørgrav | 709/224 |
| 7,051,098 | B2 * | 5/2006 | Masters et al. | 709/224 |
| 7,058,953 | B2 * | 6/2006 | Willard et al. | 718/105 |
| 7,096,469 | B1 * | 8/2006 | Kubala et al. | 718/100 |
| 7,415,708 | B2 * | 8/2008 | Knauerhase et al. | 718/1 |
| 7,448,037 | B2 * | 11/2008 | Arimilli et al. | 718/104 |
| 2002/0129127 | A1 * | 9/2002 | Romero et al. | 709/220 |
| 2002/0178262 | A1 * | 11/2002 | Bonnell et al. | 709/225 |
| 2003/0009543 | A1 * | 1/2003 | Gupta | 709/223 |
| 2003/0110250 | A1 * | 6/2003 | Schnitzer et al. | 709/224 |
| 2003/0126254 | A1 * | 7/2003 | Cruickshank et al. | 709/224 |
| 2003/0126255 | A1 * | 7/2003 | Rice et al. | 709/224 |
| 2003/0126256 | A1 * | 7/2003 | Cruickshank et al. | 709/224 |
| 2004/0226015 | A1 * | 11/2004 | Leonard et al. | 718/100 |
| 2004/0268347 | A1 * | 12/2004 | Knauerhase et al. | 718/1 |
| 2005/0216860 | A1 * | 9/2005 | Petrov et al. | 715/810 |
| 2006/0136582 | A1 * | 6/2006 | Mills | 709/224 |
| 2007/0094367 | A1 * | 4/2007 | Esfahany et al. | 709/223 |

* cited by examiner

*Primary Examiner*—Meng-Ai An
*Assistant Examiner*—Abdullah Al Kawsar
(74) *Attorney, Agent, or Firm*—Marsh Fischmann & Breyfogle LLP; Kent Lembke; Michael C. Martensen

(57) ABSTRACT

A virtual zone management framework manages one or more virtual computing zones forming a global computing zone residing on a host computer. The virtual zone manager comprises a normalization engine, a zone probe, and an interface engine that manages each virtual computing zone residing on the host computer. The virtual zone manager manages the services operating on each virtual zone while simultaneously managing the global computing environment using probes and/or agents to gather data and zone characteristics in response to a triggering event. Once data of interest are gathered for each zone, they are normalized so as to present a consistent and compatible representation of the characteristics with respect to the other virtual computing zones. Based on a comparison and analysis of the normalized characteristics, the virtual zone manager manages each of the virtual zones within the global computing environment as well as the global computing environment itself.

18 Claims, 5 Drawing Sheets

PERFORMANCE MANAGEMENT IN A VIRTUAL COMPUTING ENVIRONMENT

BACKGROUND OF THE INVENTION

1. Field of the Invention

The present invention relates, in general, to performance management of computer systems, and, more particularly, to software, systems, and methods for performance management of virtualized and partitioned computing environment.

2. Relevant Background

Escalating costs of managing vast networks of servers, software applications and components has driven the computer industry to find new ways to reduce IT infrastructure costs and better manage end-user service levels. Server consolidation, virtualization and partition techniques have enabled systems within data centers to be visualized and managed as interconnected computing resources rather than as individual systems. Virtual application zones, also referred to as containers and virtual computing zones, allow data center service providers to manage applications and services independently, control resource utilization, isolate faults and ensure security between multiple applications and services.

Virtual zones isolate applications and services by using flexible, software-defined boundaries. Using these techniques, software can be partitioned to allow the creation of many execution environments within a single instance of an operating system. Each environment has its own identity, separate from the underlying hardware, yet behaves as if it is running on its own system, making consolidation simple, safe and secure.

Virtual zones are location independent meaning that applications can be installed, configured and moved as needed. Each application runs in its own private environment allowing many applications to be deployed and run on a single physical host without fear that they will impact or interfere with one another. Accordingly, system and network resources can be allocated and controlled on a fine-grain basis. When several zones operate on a single physical server or host computer, the computing resources of the server can be allocated and prioritized as needed. In one instance, computing resources of the server can be dedicated to a single application while at another instance of time, and without moving the applications or rebooting the system, the computing power of the server can be shared between several applications.

The private environment in which each virtual zone operates isolates error propagation, prevents unauthorized access to the application and enhances application efficiency. However, the same isolation that makes virtual zone computing so attractive also makes performance management a challenge. Applications running in a zone "appear" to be running on their own system when they are in fact sharing the same underlying host operating system. Thus, the applications running in a non-global zone (also referred to herein as local zones) are unable to control the global aspects of the system such as run level, the physical components of the device, network routing, etc., because they think they are operating by themselves unimpeded by other applications.

To help manage the virtual computing environment, non-global zones are typically grouped together to form a global zone. Each non-global zone operates independent of one another and is only aware that it is associated with a global zone. Only the global zone is aware of each non-global zone operating within its realm of responsibility. One typical role of the global zone is to manage the resources of the computing environment of which each non-global zone is part. Given the vast flexibility and independent nature of each virtual application zone, most traditional performance management tools are ill-suited to manage such a virtualized and partitioned computing environment.

One performance management tool for detecting and measuring performance of an application and system uses agents that instrument and collect data with respect to processes operating on a particular system of interest. Several such agent based performance management tools are currently available. These include HP Openview, IBM Tivoli, CA Unicenter, Micromuse Netcool, and BMC Patrol, etc. As one might expect, each product possesses vendor specific event definitions, agent based solutions and various protocols. Any one product may be well suited to a single virtual zone application while ill-suited for another zone. It has become a challenge, therefore, to consolidate vendor specific events and event definitions so as to orchestrate the performance management of services operating on multiple non-global zones. It has also been difficult to ensure that applications, services, transactions, processes, operational metrics and service levels are achieving optimal results.

Service providers, data center operators and system administrators need to effectively provision, manage and monitor both non-global and global zones. There is a need, therefore, to monitor and manage the consolidated server resources as well as a need to scrutinize non-global zone allocation and usage.

It is difficult to gain a proper perspective of the performance of an aggregation of zones operating on a particular server. Logically two approaches for monitoring managing virtual zones are available. In a first approach, a single management entity exists in each of the virtual zones. In smaller systems, a single agent based batch management solution such as this can provide some management and monitoring relief. However, such a single agent solution is not effectively scaleable to large complex systems as it would create an unacceptably long run event queue due to the duration of the monitoring updates. The result would be an unacceptable general degradation of general system service level. In addition, agents for each virtual environment may create incompatible data or events due to application specific and vendor specific monitoring implementation. This complicates integration issues for performance and fault management. Additionally, a distributed agent or monitoring entity solution requires additional bandwidth and results in a disproportionate amount of monitoring traffic.

A second logical approach is to have one monitoring entity on the global zone that enables an agent from a single system to monitor each non-global zone. The monitoring entity monitors both the global zone and each of the virtual zones. The agent pulls data from the local zone and reports back to the centralized monitoring applications. Each virtual zone environment will generate a differing amount and quality of data. Furthermore, the reports will arrive at different times and are, with respect to disparate applications, difficult or impossible to compare. The global agent, therefore, becomes a single central bottleneck of the management traffic and event.

There is a need for intelligent monitoring and management services across multiple virtual zones allowing for dynamic resource allocation. What is needed are computer implemented methods, computer readable media and computer systems for monitoring and performance management of virtualized zones operating in a computing environment.

SUMMARY OF THE INVENTION

A virtual zone management framework capable of managing one or more virtual computing zones residing on a host computer as well as the global computing zone of the host computer is described. The virtual zone management framework is responsible for routine zone service management such as zone service and instance discovery, provisioning, patch management etc., as well as zone performance management such as measurement, collection, sampling, detection, correction, etc. In one embodiment of the present invention, a virtual zone management framework comprises a central zone manager comprising transport binding components, a normalization engine, a scalable messaging bus, and lightweight zone probes. According to one aspect of the invention the management framework is employed with a proxy service engine for external management applications or entities. From data center operation perspective, the present invention integrates external management entities and applications through a messaging bus.

According to one embodiment of the present invention, the external management entities forming the management framework comprise a service and performance manager, security manager, compliance manager, fault manager, service level manager, service transformation engine, a transport binding and messaging normalization component, scalable messaging bus, a universal management interface and lightweight management probes. The management framework can be integrated and orchestrated with external management entities and applications with synchronous and asynchronous messaging protocols via the messaging bus to achieve high available and reliable quality of services. The virtual zone manager operates to monitor the services operating on each virtual zone while simultaneously managing the global computing environment of the host computer via lightweight zone probes. In addition, a transport binding component accomplishes protocol dispatching (coupling specific transfer protocols with a particular message or request) and invocation of the normalization engine.

In another aspect of the present invention, the virtual zone manager uses probes and/or agents present in the virtual computing zone to gather data and zone characteristics for data collection and sampling in response to a triggering event. Alternatively, specific characteristics of the virtual computing zone are periodically monitored and fed to the virtual zone manager. Once data pertaining to the characteristics of interest are aggregated, they are normalized so as to present a consistent and compatible representation of the characteristics with respect to the other virtual computing zones for further service management, performance management and fault management orchestration. Based on a comparison and analysis of the normalized characteristics, the virtual zone manager manages each of the virtual zones within the global computing environment as well as the global computing environment itself.

In another aspect of the present invention, the virtual zone manager communicates with and acts as a transparent proxy management service layer to a computer network. As management requests are received by the virtual zone manager from other computer resources via traditional SNMP or any other named network transport protocols, the virtual zone manager normalizes the request to be consistent with characteristics of the targeted virtual computing zone and dispatches protocol agnostic instructions to the appropriate virtual zone.

The virtual zone manager also examines the implications that the directive or instruction may have on the overall global environment and, if necessary, adjusts resource allocations and the operating environment to enable each virtual zone on the host computer to operate optimally. The above host based performance detection and monitoring can also be aggregated or broken down to a finer zone level of detail.

In yet another aspect of the present invention, the virtual zone manager responds to an indication of a pending or actual service failure by querying the remaining virtual computing zones to determine if excess computing capacity exists on the host computer. This action of correction management is achieved by service orchestration via a fault management proxy within the zone manager, or by the external data center fault management service integration. If virtual zones on the host computer are identified with excess capacity, the resource allocation of each virtual computing zone is adjusted to provide the failing virtual computing zone with additional computing resources. Alternatively, the services running on the virtual zones on the host computer can be scaled up or scaled out within the global zone through zone provisioning and service provisioning. When excess computing capacity is not identified on the host computer, the virtual zone manager serves as a mediate layer to other network resources to identify computing resources on the network sufficient to enable the services operating on the failing virtual computing zone to be relocated.

These and other aspects of the present invention are fully described in detail in light of the following text and figures.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The present invention is illustrated and described in terms of the aforementioned figures and the following text. Described below is an intelligent zone service and performance management model for virtual application zone computing. The present invention defines an event driven solution to virtual zone service and performance management. A further aspect of the present invention is a virtual zone management framework which is capable of monitoring and provisioning system resources to achieve desirable service levels by insulating disparate management systems and network elements to expose consistent and standard-based management service to external providers.

Figure 1:
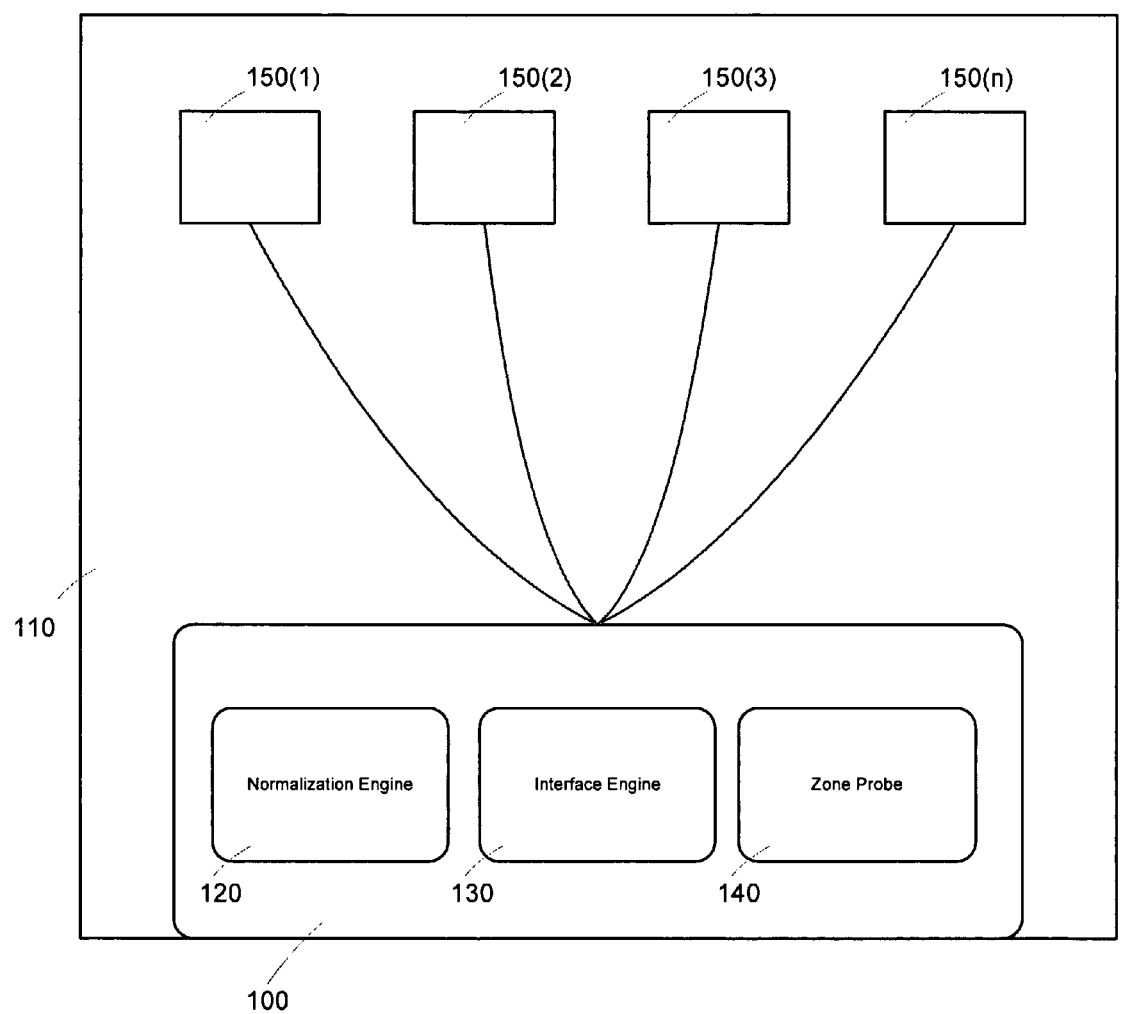
FIG. 1 shows a high level block diagram for managing virtual computing zones according to one embodiment of the present invention.

FIG. 1 illustrates a high level block diagram of a system for managing virtual computing zones on a host computer system wherein the host computer system is part of a computer network. As the core element of zone management framework, a virtual zone manager 100 accepts inbound normalized messages that are decoupled from transport specifics such as protocols, formats, etc. Once accepted the virtual zone manager 100 routes the request to instrument and manage the computing environment of at least one virtual (local) zone and of the global zone to which the virtual zone is a part. The virtual zone manager 100 is a centralized interface comprising protocol binding components that decouple transport specifics from incoming messages and requests, a normalization engine 120 for messaging normalization, a zone router for message dispatching, and a proxy service engine for external business service. The virtual zone manager 100 is capable of performance management of data center operations, change management, performance management, help desk functions, etc., for both the global and local zones of a computer system. The virtual zone manager 100 orchestrates the IT composition of zone specific management solutions, external traditional data center management and automation solutions. The virtual zone manager 100 further manages data and performance collection and reporting as well as change management pushed down to the individual virtual zones such as configuration deployment and resource provisioning.

It is to be understood that although the virtual zone manager 100 is illustrated as a single entity, as the term is used herein, a virtual zone manager 100 refers to a collection of functionalities that can be implemented as software, hardware, firmware or any combination of these. Where the virtual zone manager 100 is implemented as software, it can be implemented as a system library or kernel module such as driver program, or as one or more statically or dynamically linked libraries, or user process running locally to the managed host. It can also be implemented in other ways, for example, as part of an enterprise large-scale management solution, as well as an external service process running on a dedicated zone management host. A virtual zone manager 100 can be enabled on and/or as part of a server, client, firewall, proxy, gateway, switch and/or any combination of these and/or other computing devices and/or platforms.

The virtual zone manager 100 provides a central single view portal through which a user such as a data center operation staff can monitor and manage a computing system comprising one or more virtual zones. Beyond traditional performance and monitoring tools, the virtual zone manager 100 provides the user with the ability to facilitate changes via an event driven model. The centralized role of the virtual zone manager 100 allows a user to globally and locally compose and orchestrate traditional enterprise management solutions such as change management, asset management, performance management, accounting, regulatory compliance, database change management, policy control, identity, discovery, orchestration, binding, probe management, portals, ILM and SSO as well as any other management services associated with a computing environment.

FIG. 1 shows a high level depiction of one embodiment of a virtual zone manager 100 residing in a host computer system 110 such as a server or similar computing entity. The virtual zone manager 100 in this exemplary embodiment is comprised of a normalization engine 120, an interface engine 130 and a zone probe 140. The virtual zone manager 100 is communicatively coupled to each virtual zone 150(1), 150(2), 150(3) . . . 150(n) residing in the host computer system 110. In other embodiments of the present invention, one or more components of the virtual zone manager 100 further comprises functionality for a transfer binding component, a zone message router, a zone bus and a service proxy engine.

In this particular embodiment of the present invention, the virtual zone manager 100 discovers, detects and measures each virtual computing zone 150 to determine each virtual computing zone's characteristics. Depending on the application running on the virtual computing zone 150 or the services being conducted, the particular format of the probing data collection or sampling may differ. The present invention uses an event driven system that responds to an occurrence or a request. In one example, a request for information from one or more external management applications is listened to and accepted by the transport binding components of the virtual zone manager 100. The binding component invokes the normalization engine 120 whose output is dispatched by a zone router to a specific zone probe 140, which instruments and probes a particular virtual computing zone 150. The normalization engine 120 modifies the request to the correct format for probes operating at the selected virtual computing zone 150. The zone router is aware of the particular environment running on each virtual computing zone 150 so as to dispatch the inbound message, or route the outbound messages, to proper interested parties. The normalization engine 120 also collects and reports information from both the global zone and the virtual computing zones 150. The binding component of the present invention supports any of the agent based data collection protocols such as Remote JMX, CMIP, SNMP agent, Management Information Base (MIB) etc, or agent-less solutions such as Command Line Interface (CLI), system calls, DProbe etc.

Normalization, in one embodiment of the present invention, is implemented by the normalization engine 120 using XML schema to identify and normalize resource characteristics. Each zone comprises a collection of resources that are available to be managed by the virtual zone manager 100. A collection of these characteristics is referred to as a pool, i.e. a pool of resource characteristics. Each virtual computing zone 150 is associated with a single pool of resources. Several virtual computing zones 150 comprising a global zone may share all or some of the resources from any single pool. The pools combine to form the global zone pool of resource characteristics. The resource characteristics for a given virtual computing zone 150 affect only that zone and can be used to control projects, tasks, processes, etc. associated with that zone. Normalization, in one embodiment, uses a hierarchal approach to normalize zone characteristics. In an exemplary embodiment of the present invention, a hierarchal structure comprising system, project, task, pool, extended accounting, and zone characteristics is established. The zone probe 140 monitors each zone and identifies characteristics of that particular zone. System characteristics such as active processes, physical memory, free memory, system calls, CPU usage, etc. are identified and associated with that zone. Following the system level identification, the zone is probed for project, task, pool, extended accounting and finally zone characteristics. For example, a system characteristic of physical memory, may have a project characteristic requirement. That project requirement may in turn necessitate a task characteristic which drives a series of pool characteristics, and so forth. Once each characteristic is properly identified in such a hierarchal fashion, each characteristic is converted (normalized) to match the format and protocol of the global zone. In other embodiments, an in-memory thread safe data structure such as a Hash-table can be used to normalize zone characteristics as can a thread safe TreeMap data structure and a cached XML instance structure.

In other embodiments, the virtual zone manager 100 can operate with other data collection and monitoring tools as would be known to one skilled in the art. These and other implementation strategies and methodologies for data collection and sampling from a virtual computing zone 150 can be successfully utilized by the virtual zone manager 100 and external traditional management applications. These implementation methodologies are known within the art and the specifics of their application within the context of the present invention will be readily apparent to one of ordinary skill in the relevant art in light of this specification.

Once the zone probe 140 (optionally a proxy service engine) gathers data, the data is examined for compatibility with the global computing zone. A global computing zone comprises one or more virtual computing zones 150 and accordingly must evaluate data from diverse applications. As each virtual computing zone 150 operates isolated from the other virtual computing zones 150, data from each zone and the means by which it is collected is unique and may be ill suited for comparison or comprehensive management.

The virtual zone manager 100 gathers data appropriate for a triggering event, normalizes the data for comparison, and manages the local and global computing environments based on the normalized data. Changes made by the virtual zone manager 100 are conveyed back to the individual virtual computing zones 150 via the binding component functionality of the interface engine 130 in the format compatible with the corresponding virtual computing zone 150. In another embodiment of the present invention, the zone probe 150 or proxy service engine periodically gathers key performance indicators regarding service performance of the virtual computing zone 150 to ascertain if the global computing environment is optimally provisioned and optimally performing.

Figure 2:
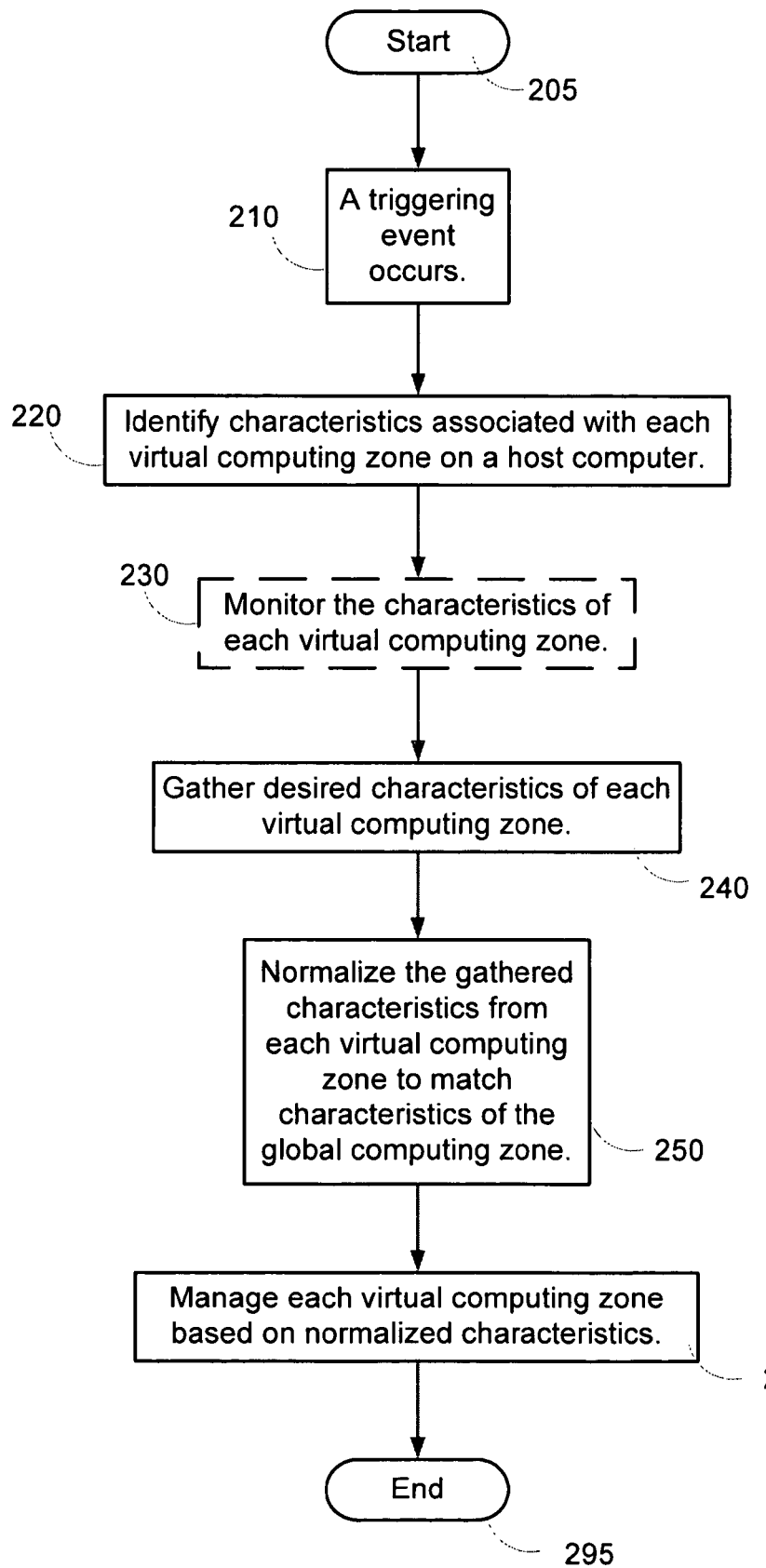
FIG. 2 shows a flow diagram of one method embodiment for managing virtual computing zones according to one embodiment of the present invention.
Figure 3:
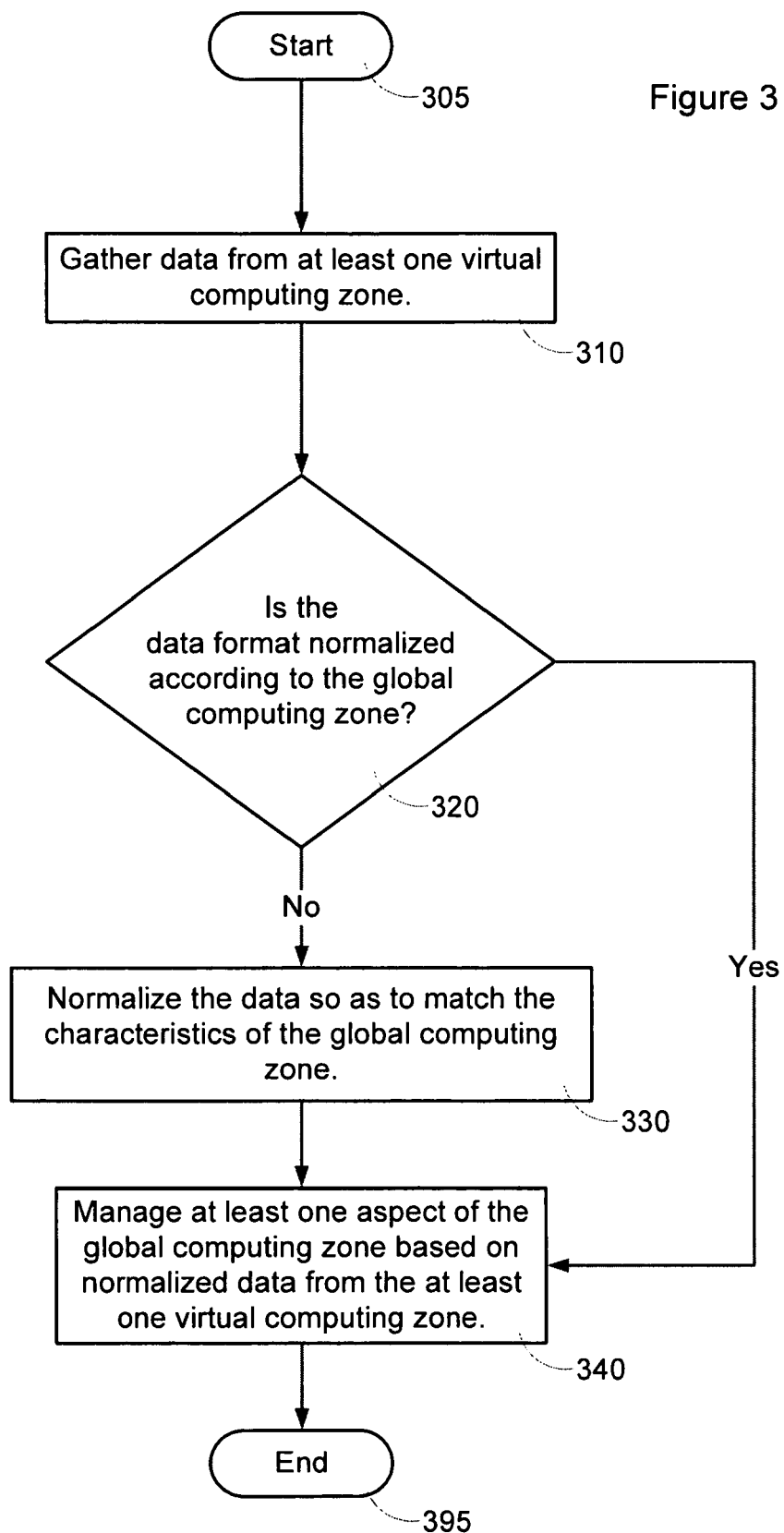
FIG. 3 shows a flow diagram of one method embodiment for managing a global computing zone according to data gathered from virtual computing zones.
Figure 4:
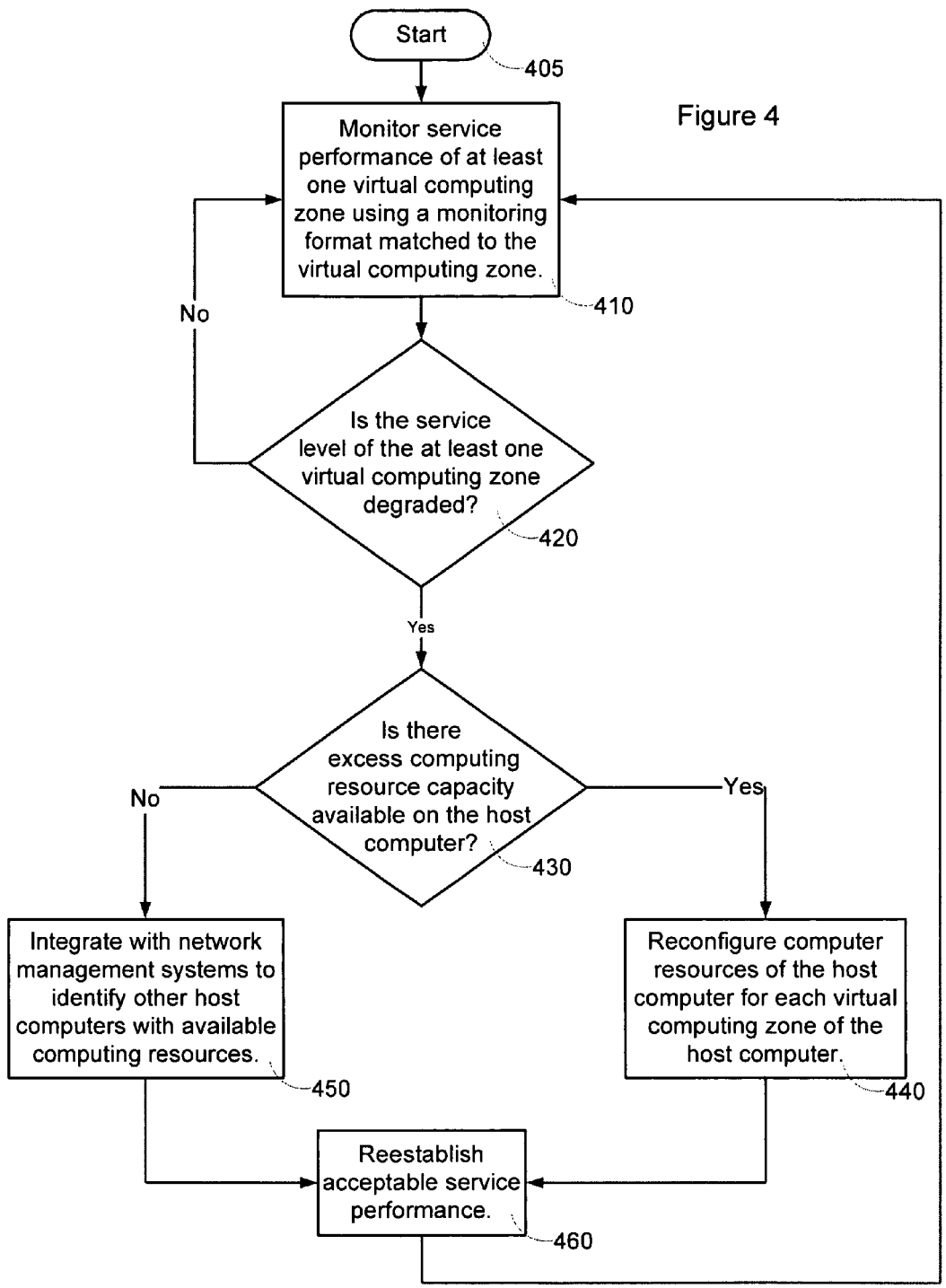
FIG. 4 shows a flow diagram of one method embodiment for monitoring and responding to service degradation of a virtual computing zone.

FIG. 2 shows a flow diagram of one method embodiment for managing virtual computing zones according to one embodiment of the present invention. Unless described otherwise herein, the individual blocks depicted in FIGS. 2-4 are well known, or those skilled in the relevant art can easily implement such blocks (such as creating source code in Java, C, C+, or any computer executable code). As shown in FIG. 2, once the virtual zone manager 100 is aware of an event trigger 210, the zone probes are invoked and instrument the appropriate virtual computing zone(s) 150 to identify 220 and gather 240 the pertinent characteristics of the virtual computing zone 150 or applicable data. As previously described, the virtual zone manager 100 acts as a centralized controller for all aspects of the virtual computing environment. Accordingly, characteristics of each virtual computing zone 150 encompass numerous aspects or characteristics of the virtual computing environment. Characteristics include resources allocation and usage, service availability and performance, service threshold, system configuration and/or any other characteristic associated with a computing environment.

The desired characteristics are collected in a format and by a method particularly suited for each virtual computing zone 150. Once collected, the data is normalized 250 based on the event triggering the interest, the data collected from the other virtual computing zones 150, and the global zone itself. The normalized data is analyzed by the virtual zone manager 100 to arrive at a proper course of action by which to manage 260 the pertinent virtual computing zone 150. In some instances no changes are necessary. In other cases, a minor change may be directed of a particular virtual computing zone based on the global computing environment. In other cases, the entire global environment may have to be altered based on a report from a single virtual computing zone 150.

The virtual zone manager 100 provides a user with a single all-encompassing and central interface by which he or she can monitor, access and manage the local and global computing environments. FIG. 3 depicts a method according to the present invention for managing a global computing environment on a host computer based on data gathered from one or more virtual computing zones. As shown in FIG. 3, data is collected 310 from at least one virtual zone normally based on some triggering event. The data is examined 320 to see if it is in a format compatible with the virtual zone manager 100 for the global computing zone. When the data is compatible with the global zone, the virtual zone manager 100 uses the data to determine whether the global computing zone is in need of adjustment. When the data is found to be incompatible with that of the global computing zone, the data is normalized to match the format of the global computing zone.

Once normalized, the data is examined to determine if adjustments in the computing environment are necessary. For example, new compliance regulation may trigger the virtual zone manager 100 to gather data regarding data storage and resource allocation for each particular virtual computing zone. A zone may reply back that its storage protocols are not in compliance and that if adjusted to be in compliance it would exceed its allocated resource allocation. Based on a normalized comparison of the data gathered from all of the zones, the virtual zone manager 100 can manage 340 resource allocation of the global computing zone to provide the potentially failing zone with additional resources thus preventing a service failure. The resource allocation of virtual zones 150 having excess computer resources as compared to usage requirements can be reduced temporarily while the resource allocation of the struggling zone can be increased. Furthermore, the virtual zone manager 100 can direct each zone to alter its storage procedures to be in compliance with the new policy directive.

The virtual zone manager 100 is a centralized access point that can provide a single portal into the performance, capability and configurations of each virtual computing zone 150 so as to ensure over all optimal performance while retaining the advantages embraced by virtualized zone computing.

FIG. 4 shows another embodiment of the present invention. In general, alternatives and alternative embodiments described herein are substantially similar to previously described embodiments, and common elements and functions are identified by the same reference numbers. Only significant differences in construction or operation are described in detail. FIG. 4 depicts a method embodiment of the present invention for recognizing and responding to a particular characteristic of the virtual computing zone. In this exemplary embodiment, service degradation or failure of a virtual computing zone is examined. As would be apparent to one skilled in the art, other characteristics of each virtual computing zone 150 can be equally monitored and managed by the virtual zone manager 100. In this embodiment, the monitor engine 140 of the virtual zone manager 100 monitors 410 service performance of each virtual computing zones 150 associated with the global computing zone and managed by the virtual zone manager 100.

The monitor engine 140 periodically queries each zone according to each zone's particular agent or probe to determine if the service level of any one virtual computing zone 150 is degraded 420. An affirmative reply triggers the virtual zone manager 100 to determine 430 if there is excess computing capacity available on the host computer. This is accomplished by a query sent out to each virtual computing zone 150 to determine if the assigned service is commensurate with the allocated computer resources. Typically not all of the computing resources allocated to a computing zone are required to conduct the services assigned to that zone. Furthermore, in many situations computer recourses are allocated based on a worse case scenario. If a particular virtual computing zone 150 is adequately operating with less than the allocated resources, the resource allocation can be temporarily reduced. Thus an affirmative response from the zones indicating that excess computing resources are available on the host computer 110 enables the virtual zone manager 100 to reconfigure or reallocate 440 computer resources for each of the virtual computing zones 150 residing on that host computer.

When the needed computing resources are not available on the host computer 110, the virtual zone manager 100 integrates 450 with network management systems to identify other hosts and/or other virtual computing zones having available computing resources. Once the needed computing resources are found, the service operating in a degraded state on the host computer 110 is reestablished and instantiated so as to provide fully reliable and fully capable services.

The complexity of today's computing environment and the isolated nature of virtual zone computing make it desirable to centrally manage and control all aspects of virtual computing zones residing on a single host computer. The present invention gathers data through collection devices such as agents or probes as would be known by one skilled in the art implemented in each virtual computing zone. The virtual zone manager 100 is compatible with any data gathering technique yet normalizes the data collected so it may be used to manage each virtual zone as well as the global computing environment. The virtual zone manager orchestrates the appropriate protocol by which to communicate with the probe applicable to each virtual computing zone. Therefore, the virtual zone manager 100 can gather information from and deliver directives or information to each virtual computing zone efficiently using the appropriate protocol affiliated with each zone.

Figure 5:
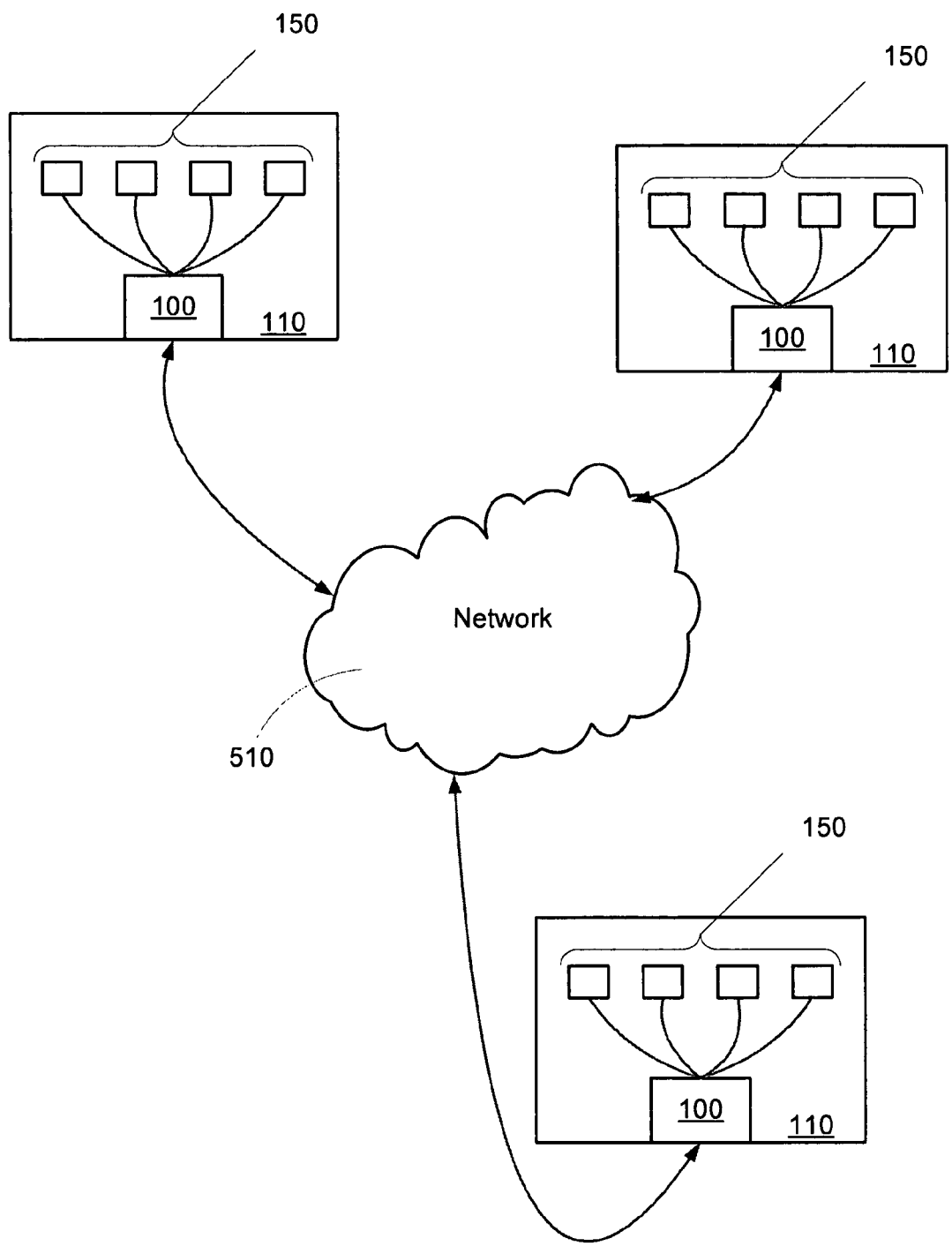
FIG. 5 shows a networked computer environment in which the present invention is implemented.

FIG. 5 shows one example of a network environment in which the present invention may be implemented. Each host computer 110 is coupled to a network 510 such as a WAN, LAN, token ring, Intranet or the Internet. Residing in each host computer is a virtual zone manager 100 that is in communication with each virtual computing zone 150 housed within that host computer 110. Aspects of each virtual computing zone 150 such as serviced performance, compliance, database management, etc., are conveyed to the network 510 via the virtual zone manager 100. Similarly, network directives regarding particular services housed with a particular virtual computing zone 150 residing on a particular host computer 110 are managed by the resident virtual zone manager 100.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with specific computer virtualization architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserve the right to formulate new claims to such features and/or combinations of such features during the prosecution of the present application or of any further application derived therefrom.

I claim:

1. A computer implemented method for managing virtual computing zones on a host computer, the host computer being part of a computer network, the method comprising the steps of:
    monitoring characteristics associated with the virtual computing zones, wherein the monitoring comprises gathering data in response to a triggering event;
    normalizing the gathered characteristics data of each virtual computing zone to match characteristics of a global computing zone including the virtual computing zones, wherein the normalizing comprises converting the gathered characteristics data to a characteristics data format associated with the global computing zone;
    managing the virtual computing zones and the global computing zone based on the normalized characteristics data; and
    collecting data from the at least one of the virtual computing zones on the host computer, wherein collecting includes sampling with a zone probe and wherein the zone probe collected data includes mandatory key service indicators, service level information, and service degradation alerts.

2. The computer implemented method of claim 1 wherein at least one characteristic of the monitored characteristics is selected from the group consisting of resource allocation and usage, service availability, service threshold, system configuration, performance level, and service level.

3. The computer implemented method of claim 1 wherein the monitoring includes using a format selected from the group consisting of an agent based solution including Remote Java Management Extensions (RJMX), Simple Network Management Protocol (SNMP), Management Information Base (MIB), and Common Management Information Protocol (CMIP), and an agent-less based solution including Dtrace probe, Command Line Interface (CLI) and system calls.

4. The computer implemented method of claim 1 wherein managing further comprises:
 identifying service level degradation on at least one of the virtual zones; and
 reallocating computing resources to prevent service failure within the at least one of the virtual zones.

5. The computer implemented method of claim 4 wherein the reallocating of computing resources includes reconfiguring computing resources for the virtual computing zones of the host computer system.

6. The computer implemented method of claim 4 wherein the reallocating of computing resources includes integrating with network management systems to identify other host computers with available computing resources and allocating a portion of the available computing resources to the at least one of the virtual zones associated with the service level degradation.

7. The computer implemented method of claim 1 further comprising:
 reformatting the sampling data from the at least one virtual computing zone to match a centralized format for global zone management on the host computer; and
 managing at least one aspect of global zone management on the host computer system based on the reformatted sampling data from the at least one virtual computing zone.

8. The computer implemented method of claim 7 wherein managing includes controlling at least one aspect of each of the at least one virtual computing zone and wherein the triggering event is an information request received from a management application.

9. The computer implemented method of claim 7 further comprising:
 receiving a request from a network resource, the request being in a particular format;
 reformatting the request to decouple transport specifics to further route inbound messages to specific virtual zone probes;
 matching the centralized format for global zone management on the host computer with zone application or service specific metrics;
 gathering data responsive to the request from the at least one virtual computing zone; and
 responding to the request in the particular format.

10. At least one computer-readable medium containing a computer program product executed by a processor for managing at least one virtual computing zone on a host computer system, the host computer being part of a computer network, the computer program product comprising:
 program code for monitoring characteristics associated with the virtual computing zones in response to a triggering event in at least one of the virtual computing zones;
 program code for collecting data from the at least one of the virtual computing zones on the host computer, wherein collecting includes sampling with a zone probe and wherein the zone probe collected data includes mandatory key service indicators, service level information, and service degradation alerts;
 program code for converting the monitored characteristics associated with the virtual computing zones, including the zone probe collected data, to match formats and protocols for characteristics of a global computing zone; and
 program code for managing the virtual computing zones and the global computing zone based on the converted characteristics.

11. The computer program product of claim 10 further comprising:
 program code for gathering data from the at least one virtual computing zone on the host computer wherein the program code for gathering includes program code for choosing a particular gathering format matching characteristics of the at least one computing virtual zone;
 program code for reformatting data from a transport specific coupling for the at least one virtual computing zone to match a centralized format for global zone management on the host computer; and
 program code for managing at least one aspect of global zone management on the host computer system based on the reformatted data from the at least one virtual computing zone.

12. The computer program product of claim 11 wherein the program code for managing includes:
 program code for controlling at least one aspect of each of the at least one virtual computing zone;
 program code for detecting service level degradation on the at least one virtual zone; and
 program code for correcting computing resources to prevent service failure.

13. The computer program product of claim 11 further comprising:
 program code for receiving a request from a network resource, the request being in a particular format;
 program code for reformatting the request to decouple transport specifics and match the centralized format for global zone management on the host computer;
 program code for gathering data responsive to the reformatted request from the at least one virtual computing zone; and
 program code for responding to the request in the particular format.

14. The computer program product of claim 11 wherein the particular gathering format is either an agent-less based passive and active tracing probes or an agent based solution.

15. A computer system storing a plurality of program codes for managing at least one virtual computing zone on a host computer system, the host computer being part of a computer network, the computer system comprising:
 a program code configured to gather data from the at least one virtual computing zone on the host computer, wherein the gathering of data is performed in response to one or more triggering events within the at least one virtual computing zone and is performed by a zone probe in the at least one virtual computing zone, wherein the zone probe gathered data includes mandatory key service indicators, service level information, and service degradation alerts;
 a program code configured to normalize the zone probe gathered data of the virtual computing zone to match characteristics of a global computing zone including the virtual computing zone, wherein the normalizing comprises converting the zone probe gathered data to a characteristics data format associated with the global computing zone; and a program code configured to manage at least one aspect of global zone management on the host computer system based on the normalized data from the at least one virtual computing zone.

16. The computer system of claim 15 further comprising:

a program code configured to receive a request from a network resource, the request being in a particular format;

a program code configured to reformat the request to match the centralized format for global zone management on the host computer; and a program code configured to respond to the request in the particular format.

17. The method of claim 1, wherein the triggering event is based on operation of one of the virtual computing zones on the host computer and wherein the gathered characteristics data includes operating characteristics of the virtual computing zone associated with the triggering event.

18. The method of claim 17, wherein the gathering of the data comprises receiving data from agents running in the virtual computing zone associated with the triggering event.

* * * * *